Patented July 9, 1940

2,207,034

UNITED STATES PATENT OFFICE 2,207,034

PROCESS OF MAKING EDIBLE COATING FOR FROZEN PRODUCTS

Robert C. Vogel, Robert W. Coblentz, and William A. Capstick, Dayton, Ohio

No Drawing. Application June 17, 1937, Serial No. 148,730

4 Claims. (Cl. 99—134)

Our invention relates to a novel composition of materials to be used for edible purposes, and to a new process for manufacturing the same.

Specifically it is a confection particularly adapted to form a unitary, protective and tasty coating for ice cream bars or rolls and other frozen delicacies such as sherbets, ices and the like.

Chocolate coated ice cream bars are well known, but the chocolate, after being chilled, hardens and becomes very brittle and tends to crack and break off in large pieces when bitten into by the consumer, thus exposing large areas of the ice cream underneath, with the result that the ice cream melts rapidly and often runs onto the hands and clothes of the consumer.

Confections having ground popcorn therein and also having the ground popcorn mixed in the coating for the sole purpose of forming a bond between the frozen confection and the coating to keep the latter from slipping off the confection when it is coated thereby, are also known.

Caramel coatings have been tried but without success as such coatings will not satisfactorily form a unitary protective coating for frozen confections, such as ice cream bars, ices, sherbets and the like.

One of the difficulties with the caramel coatings which have been tried is that when, for example, an ice cream bar is dipped in such caramel the latter slips off the ice cream when removed from the caramel material into which it has been dipped.

Many different compositions of caramel mixes were tried, but none were successful since they would not "set" so as to form a unitary protective coating.

Finally after a great many trials and experiments over a period of many months we discovered a novel process and method for producing a confection for coating ice cream bars or rolls and other frozen confections, and one which remains more or less plastic, and absolutely does not become brittle, and yet at the same time it forms a unitary protective coating for the frozen confection which it covers.

As a preference for a base for our novel confection we have chosen caramel. However we do not wish to limit our invention to the use of a caramel base, as other novel confections may be manufactured by our new process.

It is, therefore, one of the objects of our invention to produce a novel base coating for frozen confections such as ice cream, ices, sherbets and the like.

Another object is to provide a novel confection coating which is unitary in structure and which will protect the frozen confections so that they may be conveniently marketed.

A further object is the production of a new confection coating which has, not only the unitary and protective features, but one which is also soft and pliable whereby it will melt in the mouth of the consumer.

Another object of our invention is to produce a novel confection coating having all of the above mentioned features and one which has a relatively low melting point whereby the confection being coated receives the minimum amount of heat, thus quickly congealing and solidifying the fluid mixture immediately upon the withdrawal of the frozen confection from the fluid coating mixture.

A still further object is the production of a frozen confection coating material which forms a unitary protective delicious coating on frozen confections, and particularly on ice cream, so rapidly that the article may be wrapped ready for sale within a period of time much less than one minute.

Another object of our invention is to produce a novel frozen confection coating base to which various flavors and colors may be added as desired.

A more specific object is the production of a caramel base composition for encasing ice cream bars or rolls or other shapes of ice cream, which composition, while forming a protective and edible casing, will not become brittle and hence will not crack or break off in large pieces, as does chocolate coatings, when bitten into by the consumer, but will remain plastic or pliable and comparatively soft without losing its shape.

With these and other incidental objects in view our invention includes certain compositions of edible materials compounded in approximately definite combinations and at about certain cooks at different stages in the manufacture of our article, and the admixing of other essential elements at later stages in the manufacture, all of which will be specifically pointed out in the specification which follows.

Preparation of the coating

To produce our new article for coating frozen confections we have chosen caramel as our preferred base. However we do not wish to limit our process to the use of a caramel base as other substances of a like or similar nature may be used without departing from the spirit of our invention.

After determining the size of the "batch" to be made, we proceed as follows.

First we take about 19 parts of pure cane sugar, about 8 parts of glucose or corn syrup and about 7 parts of soft fat such as cream, preferably XX whipping cream, and thoroughly mix these materials by agitation and cooking. This cook is brought up to a temperature of approximately 245° Fahrenheit and then about 7 more parts of said soft fat like that above mentioned is added and the mixture now cooked again up to the above mentioned temperature.

The next step is to add condensed milk and to obtain the best results we prefer to add this condensed milk at different stages during the cooking process.

Therefore, while the cane sugar, glucose or corn syrup and cream are cooking at the above mentioned temperature we add about 6 parts of condensed milk stirred thoroughly into the mixture.

The addition of the condensed milk, the same being about room temperature, cools off the "cook" a few degrees, but it is allowed to again cook up to about 245° temperature.

At this time a "pinch" of salt is added to the batch.

The next step is to turn off the heating agent or remove the batch from the heat and immediately add to the mass thus far mixed 9 more parts of condensed milk, and stir the same well into the mixture.

The next step is to add to this mass about 44 parts of cocoa butter, cocoanut oil, or a palm kernel oil and stir or mill the admixture into a homogeneous mass.

The cocoa butter not only acts as a thinning agent, but is also an excellent preservative as it keeps a long time without turning rancid and furthermore has a very pleasant taste. It also keeps the mixture from becoming sticky or tacky after the coating has been applied to the ice cream or other frozen delicacy which it may be covering.

The next step in the process is to cool the mixture. This may be done by refrigeration or just by allowing the mass to cool down to room temperature so that it sets or solidifies. This is a very important step in the process and must be done to obtain the most desirable results.

The next and final step in the process is to remelt the mass, preferably in a double boiler or the equivalent over a slow heat. The mixture should not be allowed to reach too high a temperature during this remelting step in the process, say 100° Fahrenheit. However the mixture is best suited for dipping or coating at a temperature of between 80° and 85°, wherein it is in a fluid state and forms on the ice cream dipped therein a unitary protective coating which as stated above remains plastic after cooling which occurs within one minute's time after it is removed from the dip.

If the flavoring and coloring have not been previously added, they may be added at this time if desirable. The flavoring and/or coloring may be added if desired immediately after the condensed milk is cooked into the mixture.

The coating is now ready to be used. Ice cream bars or rolls and other frozen confections may now be coated by dipping or by any other suitable method, for example by an enrobing machine.

Due to the fact that our new coating mixture has such a low melting point it has very little effect upon ice cream. Moreover it solidifies very rapidly upon the article dipped or coated thereby and can be wrapped for sale within one minute's time after being removed from the coating material.

This feature, coupled with the feature that the coating after being applied is not brittle, but on the other hand, remains pliable and plastic, is highly desirable, as it forms a complete unitary protective coating easy to handle for storage and marketing.

With our new coating material, ice cream companies can coat large quantities of ice cream bars or rolls or other frozen confections and keep them stored in their storage rooms for comparatively long periods of time whereby they are able to stock up for special occasions before delivery or shipment to outside communities.

As stated above one of the essential steps in our new process is the solidification and remelting of the mixture at a certain time. After this has been done once, the coating material may be allowed to solidify as often as desired or necessary, for example, the manufacturer may allow it to solidify every evening and remelt it in the morning following without in any way affecting its coating qualities. Thus it is not necessary to keep a fire or other heat to keep the coating material in a fluid state over night.

Having thus described our invention and discovery, what we claim as new and desire to secure by Letters Patent of the United States, is:

1. The process of making a coating for ice cream and other frozen confections, which comprises the steps of mixing 19 parts of sugar; 8 parts of glucose and 14 parts of a soft fat and cooking the same up to a temperature of approximately 245° Fahrenheit; the step of adding 6 parts of condensed milk and bringing the cook again up to the above mentioned temperature; the step of adding 9 more parts of condensed milk; the step of adding 44 parts of a hard fat; the step of allowing this mixture to become a solid; and the step of remelting said solid mixture, the proportions being such that when the mixture is made into a coating for the above mentioned products said coating remains in a plastic state and readily melts at mouth temperature.

2. The process of making a coating for ice cream and other frozen products, which comprises the step of mixing 19 parts of sugar and 8 parts of corn syrup; the step of adding 14 parts of a soft fatty material; the step of cooking the above mixture up to a temperature of about 245°; the step of adding 15 parts of condensed milk in two stages; the step of admixing 44 parts of a hard fatty material and milling all of the above ingredients into a homogeneous mass; the proportions of the above ingredients being such that said mass, when cooled to a solid state and remelted and kept at a temperature of about 85° forms a unitary protective and pliable coating on ice cream and other frozen products when either of them are coated with said coating, the coating also readily melting in the mouth of the consumer.

3. The process of making a coating for ice cream and other frozen confections, which comprises the steps of mixing about 19 parts of sugar; 8 parts of glucose; 7 parts of soft fatty substance; cooking the same up to a temperature of about 245° Fahrenheit; adding 7 more parts of said substance and maintaining the cook to the above temperature; adding 6 parts of condensed milk and maintaining said temperature; cooling the mass and adding 9 more parts of condensed milk; adding about 44 parts of hard fatty substance during the cooling process; now allowing the mass to solidify; then remelting the mass until a fluid state prevails.

4. The process of making a coating for ice cream and other frozen confections, which comprises the step of cooking 19 parts of sugar, 8 parts of glucose, and 14 parts of cream to a temperature of about 245°, the step of adding 15 parts of condensed milk in two stages, the step of cooling and simultaneously milling about 44 parts of cocoa butter into the batch, the step of solidifying the batch, the step of remelting the mass and maintaining a temperature of about 85°, whereby a non-brittle coating for ice cream is produced which melts at mouth temperature.

ROBERT C. VOGEL.
ROBERT W. COBLENTZ.
WILLIAM A. CAPSTICK.